UNITED STATES PATENT OFFICE.

EDWIN GOMEZ, OF NEW YORK, N. Y.

IMPROVEMENT IN EXPLOSIVE COMPOUNDS.

Specification forming part of Letters Patent No. 122,245, dated December 26, 1871; antedated December 20, 1871.

*To all whom it may concern:*

Be it known that I, EDWIN GOMEZ, of the city and State of New York, have invented an Improvement in Explosive Compounds; and the following is declared to be a correct description of the same.

In Letters Patent No. 18,199 an explosive compound is set forth in which chlorate of potash is mixed with a compound of nitrate of lead and ferrocyanide of potash; and in Letters Patent No. 86,980 chlorate of potash is specified as mixed with sugar of lead, prussiate of potash, and nitrate of iron. My present invention is a modification of and improvement upon the aforesaid inventions, and consists in the discovery that the ingredients hereafter named will produce an explosive compound.

I mix together sugar of lead (acetate of lead) with prussiate of potash, which forms an insoluble compound that deposits from the liquid in which these substances are mixed. This deposit or ferrocyanide can be mixed with chlorate of potash, in a dry state, or after the same has been dried, or other materials may be added to intensify the flame. I prefer to prepare the ferrocyanide aforesaid by washing it to remove any impurities and then to mix therewith the chlorate of potash in a fine powder or as a solution; and if mixed together in a plastic state by the addition of water or alcohol the operation can be performed with safety. The ingredients may, however, remain separate in a dry state and be mixed as required. When these materials are mixed in a plastic form they may be made up into grains or lumps of any desired kind or size, and the said material may be molded into a cylindrical or hollow form to facilitate drying, handling, or making up into cartridges. Mucilage may be added, or other adhesive material used, sufficient to prevent the compound crumbling when dry.

I claim as my invention—

The explosive compound, of the materials and prepared in substantially the manner specified.

Signed by me this 12th day of June, A. D. 1871.

EDWIN GOMEZ.

Witnesses:
GEO. D. WALKER,
GEO. T. PINCKNEY. (71)